Nov. 6, 1934.
A. H. TAYLOR ET AL
1,979,297
AIRCRAFT ALTITUDE DETERMINATION SYSTEM
Filed Feb. 20, 1933
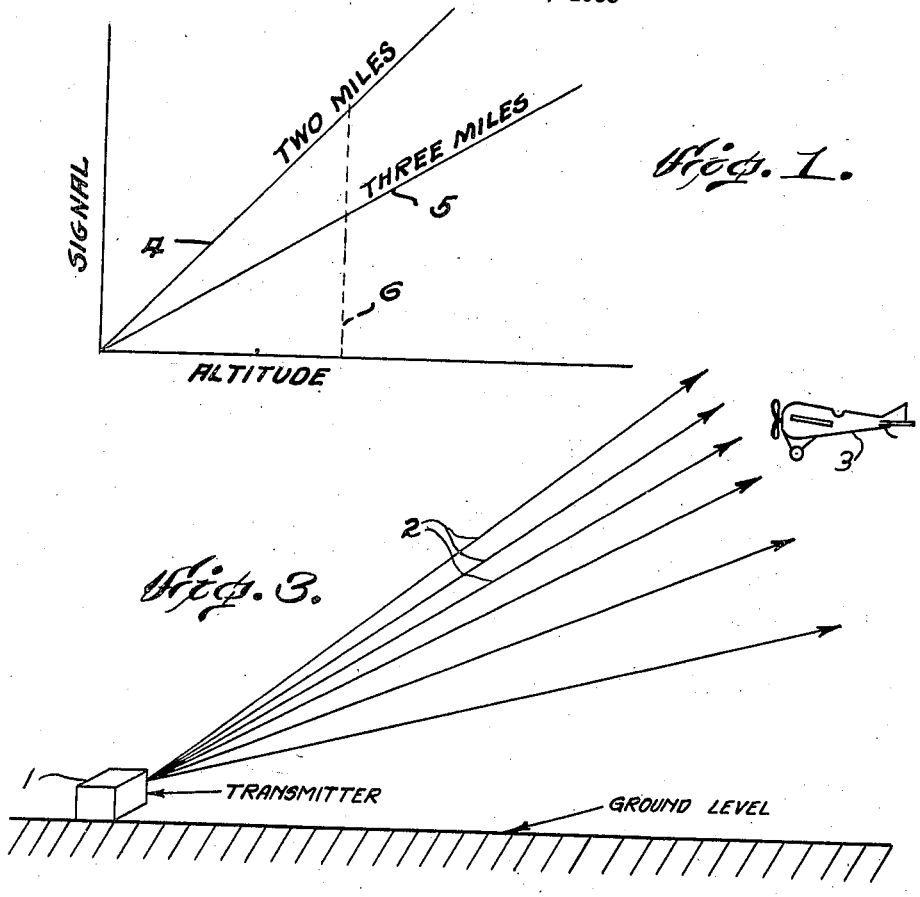
INVENTORS
A. H. Taylor, L. C. Young
BY and L. A. Hyland
ATTORNEY.

Patented Nov. 6, 1934

1,979,297

UNITED STATES PATENT OFFICE 1,979,297

AIRCRAFT ALTITUDE DETERMINATION SYSTEM

Albert H. Taylor, Leo C. Young, and Lawrence A. Hyland, Washington, D. C.

Application February 20, 1933, Serial No. 657,660

3 Claims. (Cl. 250—1)

(Granted under the act of March 3, 1883, as amended April 30, 1928; 370 O. G. 757)

This invention relates to the apparatus for and the method of determining the altitude of aircraft by the transmission and reception of high frequency electromagnetic energy.

The principal object of this invention is to enable an aircraft to determine its altitude above the level of a point on or adjacent to the earth by means of radio transmitters on the ground and indicating means connected to radio receivers in the aircraft.

With the above and other objects in view, this invention consists in the construction, combination and arrangement of parts as will be described more fully hereinafter.

The theoretical envelope of the radiations from a point source of electromagnetic energy on the surface of the earth is usually considered to be an hemisphere. Due to absorption by the earth's surface, the base of this hemispherical envelope is irregularly contracted to an area considerably less than it would otherwise normally attain. That portion of the envelope or wave adjacent to the earth's surface and attenuated by absorption, commonly known as the "ground wave", is utilized, as hereinafter described, to determine the altitude of an aircraft above the earth's surface.

It has been established that, for the very high frequencies, e. g., of the order of 30,000 kcs. or higher, the attenuation of the ground wave is very rapid. At distances greater than two miles from the source of such emanations, the attenuation of the ground wave appears to be almost linear with respect to altitudes up to 400 or 500 feet, and the amplitude of the ground wave at zero altitude is not more than ten percent of the amplitude at 400 feet. Where it is desired to make landings in inclement weather or to establish the altitude of an airplane above some obstruction such as a hill or tower on occasions when the visibility is low, the means disclosed herein will prove of value.

Referring to the accompanying drawing:

Fig. 1 shows representative graphs of received signal voltages plotted against altitude for distances of two and three miles from a transmitter.

Fig. 2 illustrates one arrangement of a di-pole antenna, high frequency radio receiver and meter or indicator as used aboard an aircraft in the practice of this invention.

Fig. 3 shows one arrangement of a radio transmitter on the ground emitting high frequency electromagnetic energy to an aircraft in flight.

In Fig. 1 are shown graphs of received signal voltage against altitude. Graph 4 shows the intensity of signal voltage received in an aircraft as plotted against its altitude at a distance of two miles from the transmitter. Graph 5 shows similar characteristics for a distance of three miles. At both distances, the signal strength on the ground is substantially the same while the signal strength at any altitude 6 is slightly greater at the two mile distance than at the three mile distance, resulting in a steeper curve for the shorter distances. Since the ground level signal is substantially the same in both cases, however, the pilot will be enabled to determine with certainty the point at which to level off his aircraft. It is understood that similar graphs may be made for other distances than those shown.

Fig. 2 illustrates one arrangement of a di-pole, high frequency antennae 7, a high frequency radio receiver 8, and a meter or other suitable indicator 9 as used aboard an aircraft in the practice of this invention. The antennae 7 and receiver 8 may be similar to any antennae and receivers in general use aboard aircraft for communication, direction finding, or distance determination. Meter 9 may be a sensitive milliammeter, or some such device, incorporated in the plate circuit of the last audio tube in receiver 8. Such meter or indicating instrument may be calibrated in units of current or directly calibrated in altitude measurements and may also be furnished with two or more scales corresponding to altitudes at different distances of the aircraft from the ground transmitter.

Fig. 3 illustrates the necessary apparatus for obtaining the above mentioned curves, comprising a radio transmitter 1 emitting super high frequency electromagnetic waves 2, an aircraft 3 equipped with suitable receiving apparatus, and an indicating device (not shown) operated by the aircraft receiver to show the magnitude of the signal voltages received or, by direct calibration, the altitude of the aircraft above the level of the transmitter.

In connection with the graphs shown in Fig. 1, it can be seen that a rough determination of the distance of an aircraft from the transmitter 1 may be obtained by maneuvering the aircraft up or down to increase or decrease the intensity of the signal and by noting the rate of change of the signal with respect to the rate of change of the aircraft in altitude, as determined by some other means, it can be determined whether the aircraft is near to the transmitter, in which case the signal intensity will vary more rapidly with a given ascent or descent than if the aircraft were more remote from the transmitter. Some determination of the distance of the aircraft from the transmitter will be necessary before any altitudes other than ground level can be ascertained with certainty. A necessary assumption in the use of this invention is that the distance of the aircraft from the ground transmitter be known. Such distance may be roughly determined as above shown or is preferably obtained by other more accurate devices, such as radio direction finding apparatus or other instruments as shown in the prior art. However, since the ground level signal is substantially of zero value at any horizontal distance from the transmitter, it is not necessary to know the exact distance from the transmitter in order to know when ground level is being approached.

Thus the operation of this invention may be described briefly as follows. An aircraft, having descended to a comparatively low altitude, is approaching its landing field which may be obscured by fog, low visibility, or darkness. By previous communication with the landing field, the radio transmitter on the ground is functioning continuously or sending out long dashes. As the aircraft proceeds toward the field, the intensity of the received signal increases. The aviator knows, then, that he is flying at an altitude well above the earth's surface. He then determines his distance from the field by direction finding or other provided means and ascertains that it is, say, three miles. A glance at his altitude indicating device, which may be connected to the same receiver he has just used to determine his distance will show him his altitude for that distance. He then descends and another similar reading taken at a distance of two miles gives him an altitude of, say, 300 feet. He then sharply descends until a low intensity signal is received which does not increase as he continues to approach, which indicates, on his instrument, that he is near ground level and can then take necessary steps for landing his aircraft. In the initial approach to the landing field, after the aircraft has descended from its normal flying level, if the aviator receives a low intensity signal which does not increase in intensity as he continues his approach, he knows he is close to ground level and may take the necessary steps to increase his altitude to a safe height. He then follows the procedure as outlined above.

The transmitter 1 in Fig. 3 may be equipped with any type of antenna system adapted to transmit a ground wave of good intensity. This antenna may be directional or it may transmit equally well in all directions. The receiving antenna and the receiver proper carried by the aircraft 3 may be of any conventional type adapted to receive frequencies of the desired range.

It readily follows from the above description that a series of such low-powered super-high frequency radio transmitters placed at strategic points will enable a pilot to safely conduct his aircraft to a landing field during periods of low visibility.

It will be understood that the above description and accompanying drawing comprehend only the general and preferred embodiment of our invention and that various changes in the construction, proportion and arrangement of parts may be made within the scope of the appended claims without sacrificing any of the advantages of this invention.

The invention described herein may be manufactured and used by or for the Government of the United States of America for governmental purposes without the payment of any royalties thereon or therefor.

What we claim as new and desire to secure by Letters Patent of the United States is as follows:

1. A method of determining the altitude of an aircraft, consisting of transmitting super high frequency electromagnetic impulses from a definite point on the surface of the earth, receiving the ground waves of said impulses at a point in the air a known distance from said first point and by the intensity of said received impulses determining the altitude of said point above the said earth's surface.

2. A method of determining the altitude of an aircraft, consisting of transmitting super high frequency electromagnetic ground waves from a point adjacent to the surface of the earth, receiving said waves at a point in the air a known distance from said first point and by the intensity of the energy received from said waves determining the altitude of said second point above said first point.

3. A system of altitude determination for aircraft, consisting of a radio transmitter adapted to emit super high frequency electromagnetic impulses located at a point on the surface of the earth, an aircraft, a receiving apparatus carried by said aircraft capable of receiving the variable energy carried by the ground waves emitted from said transmitter at a point in the air a known distance from said first point, and a calibrated altitude meter operated by said receiving apparatus whereby the altitude of said second point above said first point is directly indicated as a measure of the intensity of said received variable energy.

ALBERT H. TAYLOR.
LEO C. YOUNG.
LAWRENCE A. HYLAND.